US008547224B2

(12) United States Patent
Cho et al.

(10) Patent No.: US 8,547,224 B2
(45) Date of Patent: Oct. 1, 2013

(54) DEVICE AND METHOD FOR COLLECTING INFORMATION RELATED TO INFRASTRUCTURE, AND POSITIONING METHOD AND SYSTEM USING THE SAME

(75) Inventors: Youngsu Cho, Seoul (KR); Byung Doo Kim, Daejeon (KR); Sungjo Yun, Daejeon (KR); Myungin Ji, Daejeon (KR); Wan Sik Choi, Daejeon (KR); Dong Yong Kwak, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 484 days.

(21) Appl. No.: 12/843,472

(22) Filed: Jul. 26, 2010

(65) Prior Publication Data

US 2011/0018732 A1 Jan. 27, 2011

(30) Foreign Application Priority Data

Jul. 27, 2009 (KR) .................. 10-2009-0068539
Jul. 15, 2010 (KR) .................. 10-2010-0068528

(51) Int. Cl.
*G08B 21/00* (2006.01)
(52) U.S. Cl.
USPC ............. 340/539.13; 340/539.11; 340/539.1; 340/572.1; 340/10.1; 342/450
(58) Field of Classification Search
USPC ................... 340/572, 10, 506, 539; 342/450
See application file for complete search history.

(56) References Cited

U.S. PATENT DOCUMENTS

2006/0226970 A1* 10/2006 Saga et al. .................. 340/506
2007/0001904 A1* 1/2007 Mendelson .................. 342/450
2007/0013519 A1* 1/2007 Chung et al. .............. 340/572.1

FOREIGN PATENT DOCUMENTS

KR 10-2007-0120085 12/2007
WO 2006/110181 10/2006

OTHER PUBLICATIONS

Lionel Reyero, et al., "A Pervasive Indoor-Outdoor Positioning System", Journal of Networks, vol. 3, No. 8, Nov. 2008.

* cited by examiner

*Primary Examiner* — Mohammad Ghayour
*Assistant Examiner* — Mark Rushing
(74) *Attorney, Agent, or Firm* — Staas & Halsey LLP

(57) ABSTRACT

An infrastructure information collecting device collects measurement information including location information regarding a plurality of wireless access devices disposed in an indoor space based on an indoor map, and a positioning system generates information regarding a wireless communication infrastructure of the corresponding indoor space based on the thusly collected measurement information. The positioning system then provides the generated wireless communication infrastructure information to a terminal of which location is desired to be measured, and then the terminal measures its location based on the wireless communication infrastructure information and signals received from nearby wireless access devices.

13 Claims, 12 Drawing Sheets

DEVICE AND METHOD FOR COLLECTING INFORMATION RELATED TO INFRASTRUCTURE, AND POSITIONING METHOD AND SYSTEM USING THE SAME

CROSS-REFERENCE TO RELATED APPLICATION

This application claims priority to and the benefit of Korean Patent Application No. 10-2009-0068539 filed in the Korean Intellectual Property Office on Jul. 27, 2009 and Korean Patent Application No. 10-2010-0068528 filed in the Korean Intellectual Property Office on Jul. 15, 2010, the entire contents of which are incorporated herein by reference.

BACKGROUND OF THE INVENTION (a) Field of the Invention

The present invention relates to a positioning method and system, and more particularly, to a device for collecting infrastructure-related information based on an indoor map and a positioning method and system using the same.

(b) Description of the Related Art

Positioning techniques using a wireless communication infrastructure vary depending on types of intrastructures and a service coverage, and a global navigation satellite system (GNSS), a global positioning System (GPS), a global navigation satellite system (GLONASS), and Galileo in Europe, are currently operating or due to be operated.

The GNSS, which is disposed to serve the global area of the earth, provides high location accuracy within about 10 m or less and availability in flatlands or the suburbs in which a direct line of sight between a satellite unit that transmits a satellite signal and a reception unit that receives the satellite signal is secured, but causes a location error of about 50 m due to a multi-path error in a downtown congested area, i.e., a non-line-of-sight area. In particular, the GNSS has a problem in that the sensitivity of a reception signal is degraded in an indoor area, such that it fails to acquire a signal, so it is not possible to determine a location.

A cellular-based positioning technique is a technique for determining the location of a user by using location information and a measurement signal of a mobile communication base station, which is classified into a Cell-ID, enhanced-observed time difference (E-OTD), advanced-forward link trilateration (AFLT), and the like, depending on the number of base stations from which a terminal can receive signals. Owing to the characteristics of a mobile communication infrastructure having a service range covering a downtown area and most suburban areas, the GNSS has an advantage of allowing determination of a location even in an indoor area as well as in an outdoor area, but its accuracy of positioning varies depending on a disposition density of base stations and it has a relatively low location accuracy of about 100 m to 800 m on average. Therefore, the GNSS does not fit an indoor or outdoor navigation service, or the like, that requires location accuracy of about a few meters.

An assisted-GNSS (A-GNSS) refers to a technique of acquiring auxiliary information of a positioning server in order to improve a minimum reception signal sensitivity of a GNSS receiver installed in a user terminal and shorten time for determining an initial location (i.e., time to first fix). This technique allows fast determining of a location by using the GNSS in a downtown congested area in which a signal strength is weak, but cannot expect to obtain a great effect in an indoor area in which signal strength is very weak.

A wireless local area network (WLAN)-based positioning technique is a typical method for resolving the difficulties of the foregoing indoor positioning, which calculates the location of a terminal by using a reference location of a WLAN access point (AP) and a measurement signal. The WLAN-based positioning technique is divided into a method for acquiring a reference position of an AP, and a method for determining the location of a terminal by using the acquired reference location of the AP and a measurement signal. The method for acquiring the reference location of the AP includes a method for using the location of an AP voluntarily registered by a user through a certain device (e.g., device positioning using a Place Lab radio mark in the wild) and a method for calculating the location of an AP by a limited provider by processing measurement information collected through a planned path by using a dedicated device, and the like.

However, the existing methods for acquiring a reference location of an AP have a problem in that the accuracy of a calculated location of an AP is low, so the provided positioning service is limited. In detail, first, when the location of an AP is calculated by associating GPS coordinates acquired from an outdoor road through a GPS receiver of a certain terminal or a scanner vehicle and AP measurement information, an error increases according to an increase in the distance between a collecting device and the AP, so it is not possible to precisely determine the location of the AP within a few meters. Second, when APs are positioned within a building so transmission signals of the corresponding APs cannot be received or when collecting locations are in an area in which a GPS location reception is not available, it is not possible to determine the locations of the APs. Third, user location information obtained by calculating such AP location information is not suitable to be applied to navigation of a large-scale indoor building (an airport, an exhibition hall, a large-scale mart, an indoor parking lot, etc.) requiring relatively precise indoor positioning and a pedestrian guidance service, such that it is limited in providing a service. In order to solve such problems, a positioning system using a dedicated infrastructure is in use in a limited indoor space. The use of the positioning system ensures obtaining of a location accuracy level of 1 m to 3 m; however, because a dedicated infrastructure must be installed within each indoor building, the installation period is increased and much cost is incurred. Also, because most users are not aware of the locations of APs arbitrarily installed for the purpose of radio communication, they cannot use the APs in determining a location. In addition, it is not possible to install the dedicated infrastructure in a plurality of indoor buildings within a service area, causing a difficulty in providing a wide area service. Moreover, in order to determine the location of a user, the locations of APs must be manually determined for a database through measurement in installing the APs.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device and method for collecting infrastructure information by using an existing wireless communication infrastructure without having to additionally install a dedicated infrastructure in an indoor space.

The present invention has also been made in an effort to provide a method and system for collecting infrastructure information based on an indoor map by using a wireless communication infrastructure and measuring the location of a terminal based on the collected infrastructure information.

An exemplary embodiment of the present invention provides a method for collecting, by a collecting device, information related to a wireless communication infrastructure including at least one wireless access device in association with a positioning system in an indoor space through a network, including: setting a collection due location for collecting information on a map of a certain area and marking the set collection due location on the map; the collecting device being movable to the marked collection due location on the map and receiving, by the collecting device, a collection location inputted by a user; receiving a radio signal transmitted from at least one wireless access device of the wireless communication infrastructure located at an area within a predetermined distance based on the received collection location; generating measurement information regarding the wireless access device based on the received radio signal; and transmitting the generated measurement information to the positioning system.

Another embodiment of the present invention provides a positioning method for measuring the location of a terminal located in an indoor space, including: receiving, by a terminal, wireless communication infrastructure information related to the indoor space from a location server through a network, the wireless communication infrastructure information including identification information and location information regarding wireless access devices constituting a wireless communication infrastructure and the location information being generated based on an indoor map regarding an indoor space; receiving, by the terminal, a radio signal transmitted from at least one wireless access device constituting the wireless communication infrastructure in the indoor space; checking, by the terminal, location information of the wireless access device having corresponding identification information from the wireless communication infrastructure by using identification information extracted from the radio signal; and calculating, by the terminal, its location based on a signal measurement value of the radio signal and the checked location information.

Yet another embodiment of the present invention provides a positioning method for measuring a location by a positioning system, including: receiving, by the positioning system, a request for measuring the location of a second terminal from a first terminal; providing, by the positioning system, wireless communication infrastructure information to the second terminal, the wireless communication infrastructure information including identification information and location information regarding wireless access devices constituting a wireless communication infrastructure and the location information being generated based on an indoor map regarding an indoor space; receiving, by the positioning system, location information of the second terminal generated based on the wireless communication infrastructure information from the second terminal; and providing, by the positioning system, the location information of the second terminal to the first terminal.

Still another embodiment of the present invention provides a device for collecting information related to a wireless communication infrastructure including at least one wireless access device in association with a positioning system through a network, including: a map database storing an indoor map of each indoor space; a map display unit displaying an indoor map provided from the map database; a collection location determining unit setting a collection due location for collecting information on the indoor map displayed on the map display unit and marking the set collection due location on the indoor map; a collection location input unit receiving a certain location on the indoor map inputted by a user, as a collection location; a measurement information collecting unit receiving a radio signal transmitted from at least one wireless access device located in a predetermined area based on the collection location and generating measurement information regarding the corresponding wireless access device based on the received signal; and a communication unit transmitting the measurement information to the positioning system.

Another embodiment of the present invention provides a positioning system for measuring a location in association with an infrastructure information collecting device and a terminal through a network, including: a database storing wireless communication infrastructure information generated based on measurement information provided from the infrastructure information collecting device; a positioning information management unit providing the wireless communication infrastructure information to the terminal, receiving location information generated based on the wireless communication infrastructure information provided from the terminal, and managing the wireless communication infrastructure information of the database based on inputted registration information; and a registration information estimating unit generating registration information regarding a wireless access device constituting a wireless communication infrastructure based on the measurement information provided from the infrastructure information collecting device and providing the generated registration information to the positioning information management unit, the registration information including identification information and location information regarding wireless access devices.

DETAILED DESCRIPTION OF THE EMBODIMENTS

Figure 1:
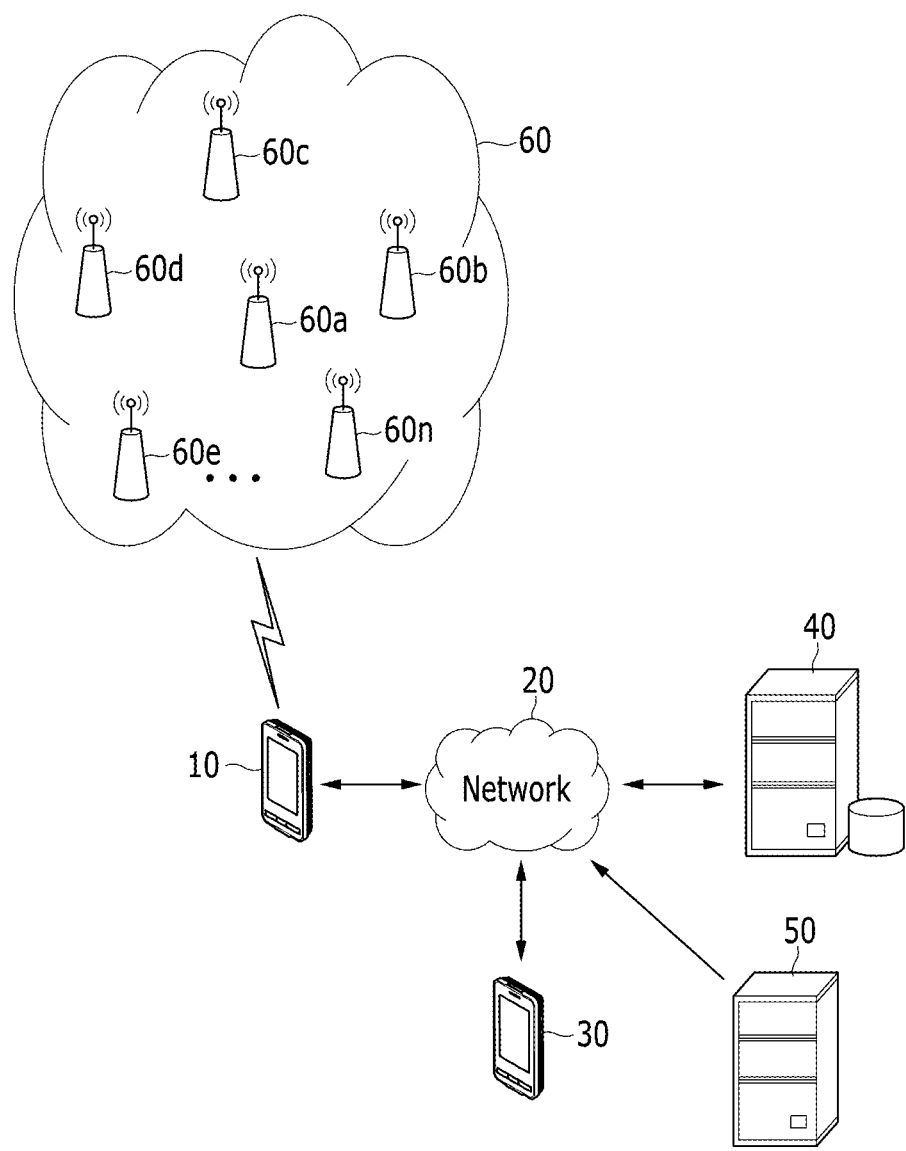
FIG. 1 is a schematic block diagram showing the structure of a positioning system based on a wireless communication infrastructure according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

In this document, a user terminal (UT) may refer to a mobile station (MS), a terminal, a mobile terminal (MT), a subscriber station (SS), a portable subscriber station (PSS), user equipment (UE), an access terminal (AT), and the like, or may include entire or partial functions of the MT, SS, PSS, UT, and the like.

In this document, an access point (AP) may refer to a base station (BS), a radio access station (RAS), a Node B, a base transceiver station (BTS), a mobile multi-hop relay (MMR)-BS, and the like, and may include the entire or partial functions of the AP, RAS, Node B, BTS, MMR-BS, and the like.

In an exemplary embodiment of the present invention, location information of an AP may be coordinates with respect to a location at which the AP is disposed or a coordinate value on a map corresponding to an indoor space from which collection is made. Identification information of the AP may be various types of units of information, such as a medium access control (MAC) address, an Internet protocol (IP) address, and the like, for identifying the AP.

In the following description, positioning is carried out in an indoor space, but the present invention is not necessarily limited thereto.

A method and system for estimating a location according to exemplary embodiments of the present invention will now be described with reference to the accompanying drawings.

Figure 2:
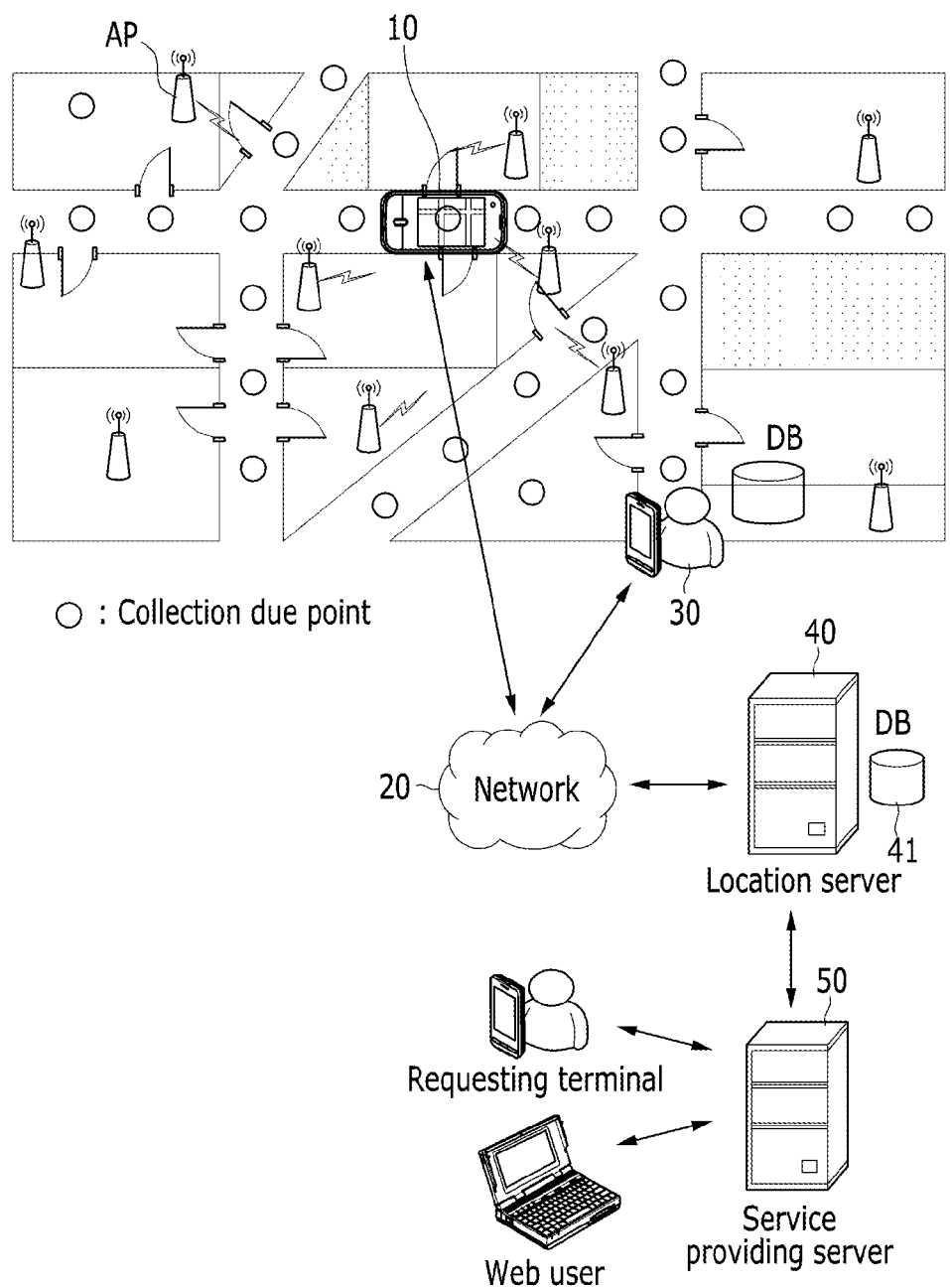
FIG. 2 illustrates a network environment established when the positioning system based on a wireless communication infrastructure illustrated in FIG. 1 is applied to an indoor environment.

FIG. 1 is a schematic block diagram showing the structure of a positioning system based on a wireless communication infrastructure according to an exemplary embodiment of the present invention, and FIG. 2 illustrates a network environment established when the positioning system based on a wireless communication infrastructure illustrated in FIG. 1 is applied to an indoor environment.

As illustrated in FIG. 1, a positioning system based on a wireless communication infrastructure according to an exemplary embodiment of the present invention is connected with an infrastructure information collecting device 10 via a network 20, and is also connected with a terminal 30, of which location is desired to be measured, via the network 20. The positioning system includes a location server 40 and a service providing server 50.

The terminal 30 may measure its location in association with the positioning system according to an exemplary embodiment of the present invention. The terminal 30 may measure its location by itself, or a first terminal may request checking of the location of a different terminal, and in this case, the location of a second terminal is measured according to the request from the first terminal. FIG. 2 illustrates a case in which the first terminal requests a measurement of the location of the second terminal. In FIG. 2, the first terminal may be a requesting terminal (including a terminal of a Web user), and the second terminal may be a target terminal. Here, the second terminal is the terminal 30. The first terminal may be a terminal that can access the positioning system via a wireless communication network, or a terminal that can access the positioning system via a wireline communication network.

As shown in FIG. 1, the wireless communication infrastructure-based positioning system having such a configuration collects information related to a wireless communication infrastructure in a certain area, particularly in an indoor space, in association with the infrastructure information collecting device 10 by using a wireless communication infrastructure 60 including a plurality of wireless access devices (i.e., access points (APs)) 60a to 60n. Further, the positioning system may measure the location of a terminal located in the corresponding indoor space based on the collected wireless communication infrastructure information. In particular, the positioning system checks the location of an AP used as a reference location for a location measurement based on the wireless communication infrastructure information generated based on an indoor map, and measures the location of the terminal based on the checked location of the AP and a signal measurement value of a signal received from the corresponding AP. The information related to the APs constituting the wireless communication infrastructure, that is, the wireless communication infrastructure information, will be described in detail later.

Figure 3:
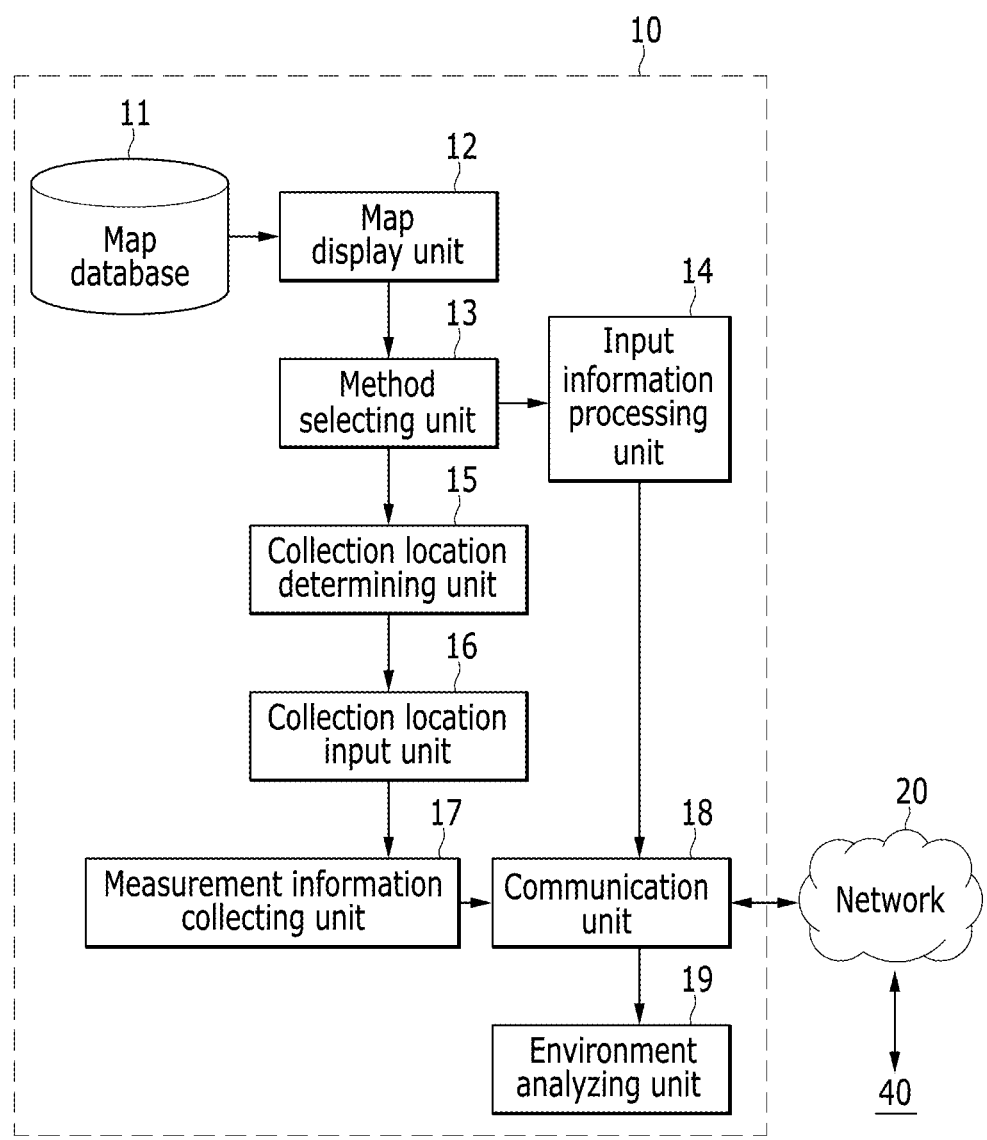
FIG. 3 is a schematic block diagram of an infrastructure information collecting device according to an exemplary embodiment of the present invention.

FIG. 3 is a schematic block diagram of an infrastructure information collecting device according to an exemplary embodiment of the present invention.

As shown in FIG. 3, the infrastructure information collecting device 10 according to an exemplary embodiment of the present invention includes a map database 11, a map display unit 12, a method selecting unit 13, an input information processing unit 14, a collection location determining unit 15, a collection location input unit 16, a measurement information collecting unit 17, and a communication unit 18. The infrastructure information collecting device 10 further includes an environment analyzing unit 19.

The infrastructure information collecting device 10 collects information regarding APs disposed in a certain area based on map information regarding the certain area including a location desired to be measured. In detail, the infrastructure information collecting device 10 sets a collection due location (or a collection planned location) in a certain indoor space, that is, a search area, for collecting wireless communication infrastructure information, scans at least one AP belonging to the set area based on a collection location inputted based on the pre-set collection due location in order to collect information regarding the AP, and transfers the collected information regarding the AP to the location server 40.

To this end, the map database 11 stores map information of each area. For example, the map database 11 stores maps of certain indoor spaces.

The map display unit 12 receives map information regarding an indoor space including APs, constituting a wireless communication infrastructure, that is desired to be searched from the map database 11, and displays the received map information. In this case, the map display unit 12 may receive geographical information (e.g., address (city/province, district/county, block/burg/town, etc.), the name of a building, story information of a building, etc.) regarding the indoor space as text, display a field for selecting geographical information and check a selected field, or receive relevant map information from the map database 11 based on the corresponding geographical information and display the same.

The method selecting unit 13 selects a method for determining the location of an AP. In detail, the method selecting unit 13 receives a method for determining the location of an AP from a user, and operates the input information processing unit 14 or the collection location determining unit 15 according to the received location determining method.

The AP location determining method may include a direct input method and a method using a collection of measurement information. The direct input method is applied to a case in which the user adds or moves a new AP to the indoor space by necessity, and in this case, an installation location of the AP is determined by the user. In the case of the direct input method, AP location information and AP identification information are directly received from the user, and the location information of the AP is displayed on a map.

Meanwhile, the method using a collection of measurement information is applied to determine the location of an AP already installed in the wireless communication infrastructure 60. As for the method using a collection of measurement information, because an installation location of an AP is not known, the location of the AP is estimated. The estimation of the location of the AP may be performed by the location server 40, but the present invention is not necessarily limited thereto, and according to circumstances, the estimation of the location of the AP may be performed by the infrastructure information collecting device 10.

When the direct input method is selected, the method selecting unit 13 informs the input information processing unit 14 accordingly, and when the method using a collection of measurement information is selected, the method selecting unit 13 informs the collection location determining unit 15 accordingly.

When the direct input method is selected, the input information processing unit 14 receives identification information and location information of the AP and processes the same. In this case, the user may input the location of the AP on the indoor map by comparing surrounding indoor region information and the location on the map of a corresponding indoor space (referred to as the "indoor map", hereinafter) displayed through the map display unit 12. The input information processing unit 14 marks the identification information of the AP at the corresponding location on the indoor map based on the received location information of the AP, and delivers the location information and identification information of the AP inputted by the user to the communication unit 18 so as to deliver it to the location server 40 via the network 20.

When the method using a collection of measurement information is selected by the user, the collection location determining unit 15 sets a collection due location in consideration of the accuracy of a requested location of a terminal whose location is desired to be measured. Further, the collection location determining unit 15 marks the set collection due location on the indoor map displayed through the map display unit 12.

The collection location input unit 16 receives a collection location for collecting measurement information. In detail, with the collection due location marked, the user of the infrastructure information collecting device 10 moves to the collection due location, while comparing the surrounding indoor region information and the location on the indoor map displayed through the map display unit 12, and then inputs a collection location to start to collect measurement information. That is, the user inputs a location for collecting substantial information on the indoor map displayed through the map display unit 12 at the current location, and the collection location input unit 16 processes the inputted location as a collection location and delivers the same to the measurement information collecting unit 17.

The measurement information collecting unit 17 collects measurement information of APs belonging to the predetermined area based on the collection location. For example, the measurement information collecting unit 17 performs a scanning operation to receive signals transmitted from the APs based on the collection location. The measurement information collecting unit 17 may determine the APs, which have transmitted signals each having strength greater than a pre-set value among the received signals, as APs belonging to the predetermined area within a predetermined distance, and collects measurement information of the APs based on the signals received from the APs belonging to the predetermined area. The information of the APs collected according to the scanning operation may be measurement information of the APs, and the measurement information of the APs includes identification information of the APs, a collection location, and signal measurement values of the APs. The measurement information collecting unit 17 provides the collected measurement information regarding at least one AP to the location server 40.

The communication unit 18 communicates with the location server 40 via the network 20. In detail, the communication unit 18 transmits the location information and identification information of the APs delivered from the input information processing unit 14 and the measurement information of the APs delivered from the measurement information collecting unit 15 to the location server 40 via the network 20. Also, the communication unit 18 receives wireless communication infrastructure information transferred from the location server 40 via the network 20, and delivers the same to the environment analyzing unit 19.

The environment analyzing unit 19 marks the locations of the APs in a database of a certain area by using the wireless communication infrastructure information transferred from the location server 40 via the network 20. The environment analyzing unit 19 analyzes a dilution of precision (DoP) of the APs marked on the indoor map and a service coverage, and analyzes location accuracy and availability of a target terminal whose location is desired to be measured in the corresponding area. Afterwards, the user may carry out an AP relocation process such as installing a new AP, rearranging an AP, and the like, in an area in which location accuracy and availability of the target terminal are degraded based on the analysis result in order to improve the performance of indoor positioning.

The structure of the location server 40 that performs a positioning operation in association with the infrastructure information collecting device 10 according to an exemplary embodiment of the present invention is as follows.

Figure 4:
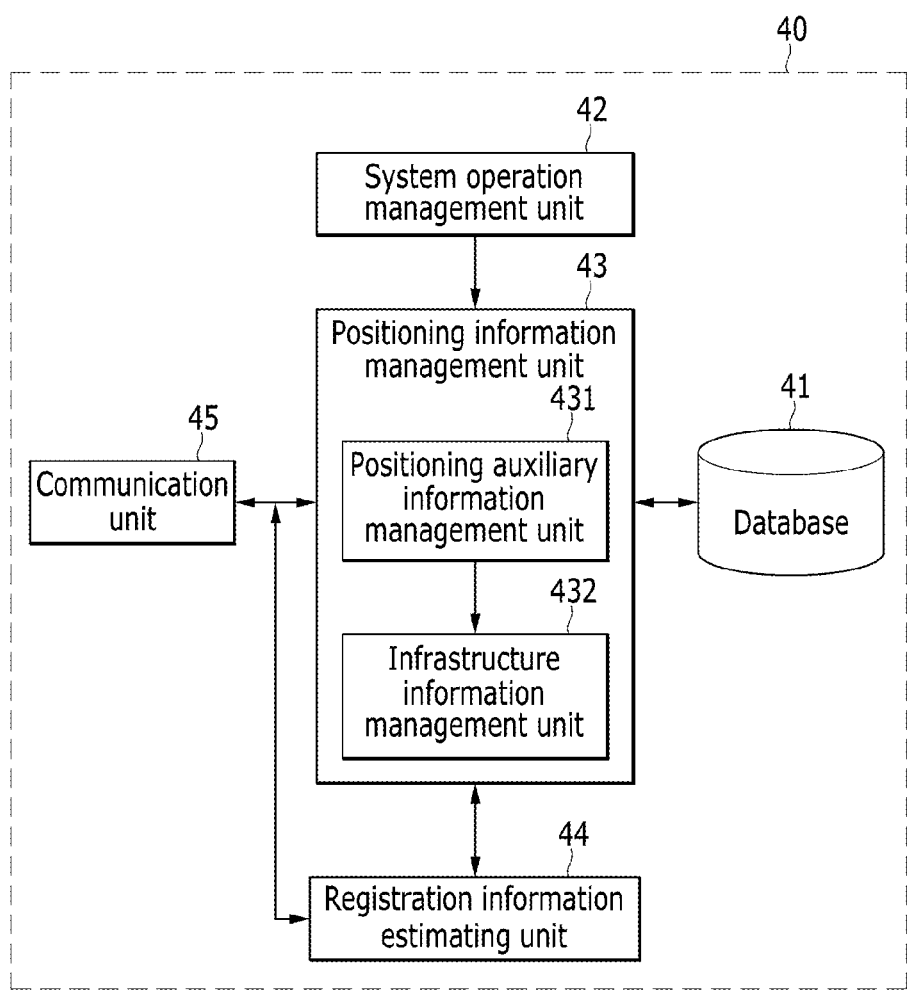
FIG. 4 is a schematic block diagram of a local server according to an exemplary embodiment of the present invention.

FIG. 4 is a schematic block diagram of the local server according to an exemplary embodiment of the present invention.

As shown in FIG. 4, the location server 40 according to an exemplary embodiment of the present invention includes a database 41, a system operation management unit 42, a positioning information management unit 43, a registration information estimating unit 44, and a communication unit 45.

The database 11 stores wireless communication infrastructure information. In this case, the wireless communication infrastructure information refers to information regarding the APs 60a to 60n constituting the wireless communication infrastructure of each area. In detail, the wireless communication infrastructure information includes identification information and location information of the APs 60a to 60n, and may further include signal characteristics information and basic information of the APs 60a to 60n. Here, the pieces of information (i.e., the location information, the identification information, the signal characteristics information, the basic information, etc.) of the respective APs included in the wireless communication infrastructure information may be collectively referred to as "registration information" of the corresponding APs.

The location information of the APs includes a space information identifier representing an area in which each AP is installed and horizontal location information, and may further include floor information. The space information identifier may include an area identifier and a building identifier. The area identifier may represent an area in which APs are installed, and may include bytes representing "metropolitan city/province", "city/county/district", and "town/burg/block", respectively. The building identifier represents that the name of a building in which APs are installed. The space information identifier may be defined to various types having the characteristics for discriminating geographical spaces.

The user of the infrastructure information collecting device 10 may use a location on a map displayed on a user interface (UI), that is, on a map displayed through the map display unit 12, as the horizontal location information. The horizontal location information may be indicated as (x, y) coordinates representing a location based on X and Y axes, (x, y, z) coordinates representing a location based on X, Y, and Z axes, and the like.

The floor identifier, a unique identifier representing floor information, indicates a floor of a pertinent building. For example, 255 floors may be identified, and in this case, 1 to 50 floors underground may be indicated as 1 to 50, and 1 to 105 floors above ground may be indicated as 51 to 255.

The signal characteristics information of the APs indicates the characteristics of signals transmitted by the APs, and includes, for example, a nominal received signal strength indication (RSSI) and reliability information.

The nominal RSSI is an RSSI value measured from a reference distance as characteristics information of each AP. For example, the nominal RSSI value corresponding to a maker and model information of a certain AP can be known based on a database of nominal RSSIs of makers and models of APs. The reliability indicates an error covariance value of an AP location calculated from measurement information.

Basic information of an AP may include identification information of an AP maker and a model name of the AP.

The system operation management unit 42 performs operations such as an operator interface, hardware status monitoring, application process status monitoring, and the like.

The positioning information management unit 43 manages information required for measuring the location of a terminal. To this end, the positioning information management unit 43 includes at least one of a positioning auxiliary information management unit 431 and an infrastructure information management unit 432.

In order to allow for fast location determination with respect to the terminal whose location is desired to be measured, the positioning auxiliary information management unit 431 receives positioning auxiliary information from a different infrastructure system (e.g., a GNSS) and provides the same to the terminal, and in this case, the positioning auxiliary information management unit 431 processes the positioning auxiliary information according to a protocol supported by the terminal that is to receive the corresponding information, and transmits the processed positioning auxiliary information. Here, the positioning auxiliary information may include satellite almanac information, satellite ephemeris information, and time information, and may further include initial location information of the terminal, and the like, The positioning auxiliary information may be provided to the terminal to allow the terminal supporting an A-GNSS (Assisted-Global Navigation Satellite System) function to determine its location in an indoor area or a shadow area, and the positioning auxiliary information management unit 431 may receive positioning auxiliary information from an A-GNSS receiver (not shown) and process the same. In this case, the positioning auxiliary information management unit 431 may receive positioning auxiliary information from the A-GNSS via the communication unit 45.

The infrastructure information management unit 432 processes information received from the infrastructure information collecting device 10 to construct or update the database 41. That is, the infrastructure information management unit 432 may update the wireless communication infrastructure information stored in the database 41, or forms new wireless communication infrastructure information based on the AP measurement information provided from the infrastructure information collecting device 10. In particular, the infrastructure information management unit 432 according to an exemplary embodiment of the present invention transmits the database 41, that is, the wireless communication infrastructure information stored in the database 41, to the terminal 30 via the communication unit 45.

Further, the positioning information management unit 43 requests location information from the terminal in association with the communication unit 45 or receives location information provided from the terminal, and delivers the provided location information to the service providing server 50.

The registration information estimating unit 44 estimates registration information regarding the APs measured by the infrastructure information collecting device 10. In detail, the registration information estimating unit 44 estimates location information of the APs based on pieces of measurement information transmitted from the infrastructure information collecting device 10, and in this case, the registration information estimating unit 44 classifies collection locations and signal measurement values by the identification information of the APs. The registration information estimating unit 44 then estimates space information identifiers based on the collection locations, and estimates location information and signal characteristics information of the APs by using signal measurement values. The registration information estimating unit 44 provides the estimated location information and signal characteristics information of the APs and the identification information of the APs to the infrastructure information management unit 43, so as to be stored in the database 41 and managed.

Meanwhile, when the AP-related information transmitted from the infrastructure information collecting device 10 include identification information and location information of the APs (that is, when the locations of APs are already determined), the registration information estimating unit 44 does not perform a location estimation but delivers the received AP-related information to the infrastructure information management unit 432 so as to be stored in the database 11 and managed.

The communication unit 45 communicates with the infrastructure information collecting device 10 via the network 20, and also communicates with the terminal 30. In addition, the communication unit 45 communicates with the service providing server 50. In detail, the communication unit 45 receives the measurement information of the APs delivered from the infrastructure information collecting device 10, delivers the received measurement information to the positioning information management unit 43, or transmits the wireless communication infrastructure information based on the database 41 to the terminal 30 according to a corresponding request from the terminal 30. Also, the communication unit 45 establishes a connection with the terminal 30 whose location is desired to be measured according to a request from the service providing server 50, or the like, receives location information provided from the terminal 30, and transfers the received location information to the service providing server 50.

The structure of the service providing server 50 providing a service of measuring a location in association with the location server 40 constructed as described above will now be described.

Figure 5:
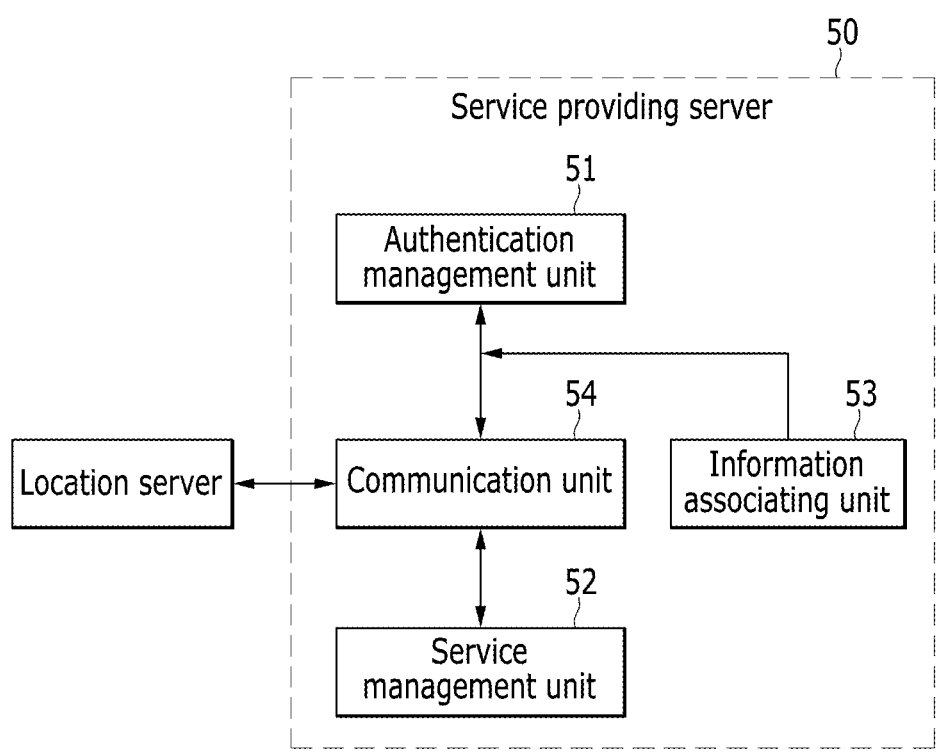
FIG. 5 is a schematic block diagram of a service providing server according to an exemplary embodiment of the present invention.

FIG. 5 is a schematic block diagram of a service providing server according to an exemplary embodiment of the present invention.

As shown in FIG. 5, the service providing server 50 according to an exemplary embodiment of the present invention includes an authentication management unit 51, a service management unit 52, an information associating unit 53, and a communication unit 54.

The authentication management unit 51 authenticates a user or a terminal that has requested a service provided through the service providing server 50. That is, when a request for a location checking service according to an exemplary embodiment of the present invention is received from a terminal requesting a location measurement or a Web user terminal (i.e., the requesting terminal in FIG. 2), the authentication management unit 51 performs authentication by using a user identification information (e.g., an ID, a password, etc.) or a terminal identification information (e.g., a MAC address, an IP address, etc.) provided from the corresponding terminal.

The service management unit 52 processes a request or a response with respect to the location checking service according to an exemplary embodiment of the present invention, and performs history management, connection status monitoring, and the like, with respect to provision of the location checking service. For example, the service management unit 52 receives information regarding a target terminal, whose location is to be checked, provided from the requesting terminal authenticated by the authentication management unit 51, and provides the received information to the location server 50 via the communication unit 54, thus requesting a measurement of the location of the target terminal. Thereafter, the service management unit 52 provides location information provided from the location server 40 to the requesting terminal or provides location-based information generated by the information associating unit 53 to the requesting terminal that has requested the service.

The information associating unit 53 processes the location information provided from the location server 40 into a format that can be provided to the user. For example, the information associating unit 52 generates location-based information that can be provided to the user through a Web in association with semantic information and other information.

The communication unit 54 communicates with the location server 40 and terminals, and sets a data connection required for a cooperative operation, or the like.

The structure of the terminal 30 that measures its location by interworking with the location server 40 will now be described.

Figure 6:
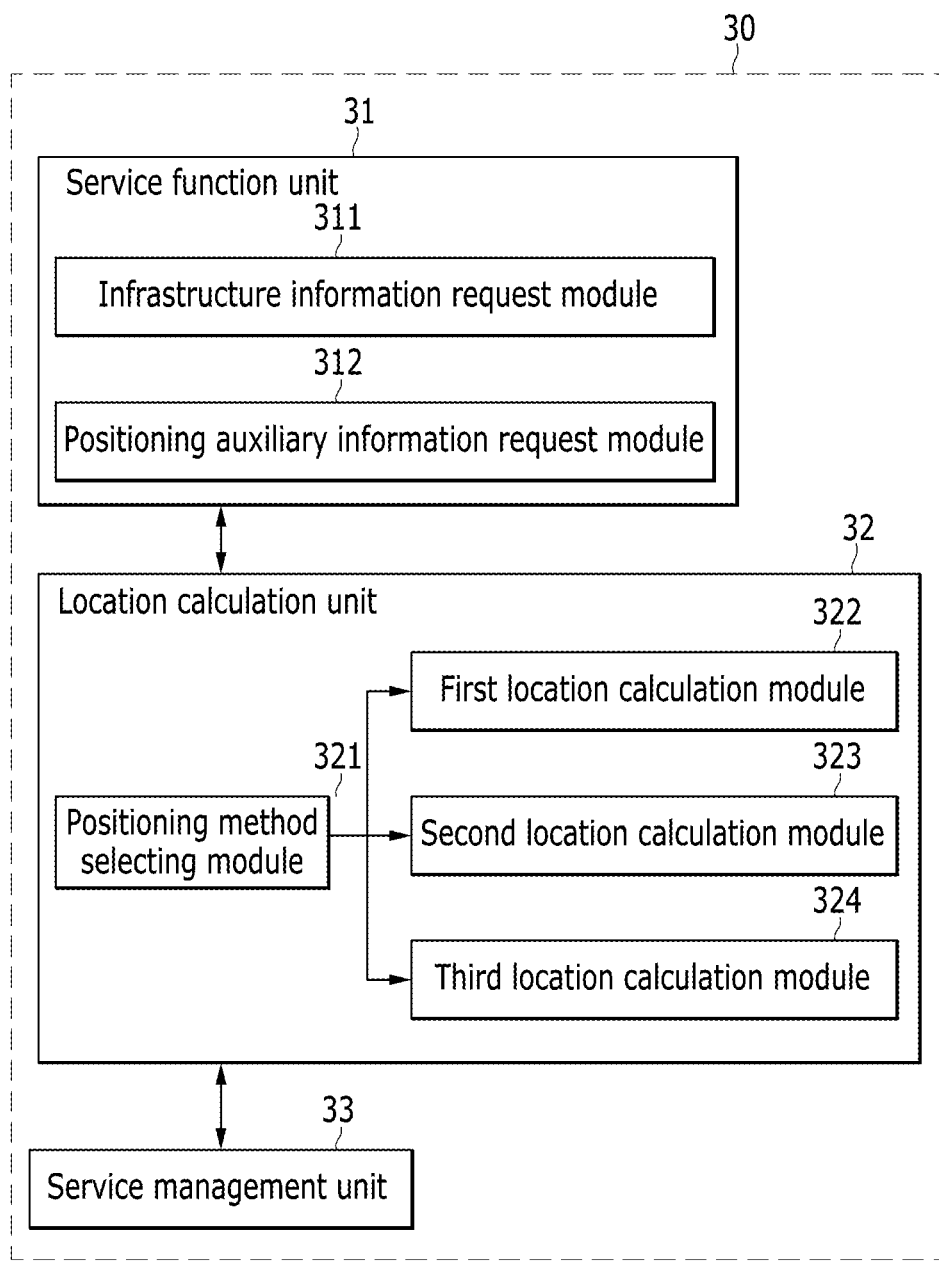
FIG. 6 is a schematic block diagram of a terminal according to an exemplary embodiment of the present invention.

FIG. 6 is a schematic block diagram of a terminal according to an exemplary embodiment of the present invention. The terminal 30 measures its location, so it can be also referred to as a "location measurement device".

As shown in FIG. 6, the terminal 30 according to an exemplary embodiment of the present invention includes a service function unit 31, a location calculation unit 32, and a service management unit 33.

The service function unit 31 receives wireless communication infrastructure information from the location server 40, or receives GNSS-related information (e.g., positioning auxiliary information, etc.). The service function unit 31 then stores the received information or provides the received information to the location calculation unit 32, so as to be used for calculating a location. To this end, the service function unit 31 includes an infrastructure information requesting module 311 that requests the wireless communication infrastructure information, and a positioning auxiliary information requesting module 312 that requests the GNSS-related information.

The location calculation unit 32 calculates the location of a corresponding terminal based on the information provided from the location server 40 and acquired measurement information of nearby APs. To this end, the location calculation unit 32 includes a positioning method selecting module 321 and at least one module for calculating the location of the terminal according to employed positioning methods. Here, the location calculation module includes a first location calculation module 322, a second location calculation module 323, and a third location calculation module 324. In this case, the terminal according to an exemplary embodiment of the present invention may include at least one of the first to third location calculation modules 322 to 324, or may further include an additional location calculation module.

The positioning method selecting module 321 selects one of the positioning methods used by the corresponding terminal, and operates a location calculation module that uses the selected positioning method.

The positioning method employed according to an exemplary embodiment of the present invention includes a wireless communication infrastructure positioning method for calculating a location by using a positioning algorithm (e.g., a positioning algorithm using a cell ID, centroid, fingerprint, trilateration, triangulation, and the like) based on a wireless communication infrastructure, a GNSS positioning method for calculating a location based on a GNSS (or an A-GNSS), and a wireless communication infrastructure/GNSS composite positioning method for calculating a location by using the GNSS and the wireless communication infrastructure-based positioning algorithm. Here, the first location calculation module 322 calculates a location by using the wireless communication infrastructure positioning method, the second location calculation module 323 calculates a location by using the GNSS positioning method, and the third location calculation module 324 calculates a location by using the wireless communication infrastructure/GNSS composite positioning method.

The respective location calculation modules 322, 323, and 324 may calculate the location of the corresponding terminal based on the location information of APs acquired based on the wireless communication infrastructure information or GNSS related information provided from the service function unit 31 and signal measurement values of radio signals transmitted from the corresponding APs. Here, the signal measurement values include a received signal strength indicator (RSSI), a signal-to-noise ratio (SNR), and a measurement value of the distance to the terminal. The location calculation modules 322, 323, and 324 may extract registration information of an AP having the same identification information as that of the AP that has transmitted a signal based on the wireless communication infrastructure information provided from the location server 40, and calculate the location of the terminal by using the extracted registration information of the AP. For example, the location calculation modules 322, 323, and 324 may check the location of an AP used as a reference AP, and may calculate the location of the terminal based on a signal received from the corresponding AP and the location of the AP.

The location calculation modules 322, 323, and 324 may acquire identification information and signal measurement values of APs 60a to 60i by using radio signals transmitted from the APs 60a to 60i among the APs 60a to 60n of the wireless communication infrastructure illustrated in FIG. 1, and further, a module may be additionally configured to acquire the identification information and signal measurement values of the APs 60a to 60i and provide the same to the location calculations modules 322, 323, and 324.

The service management unit 33 manages the location information of the terminal 30 measured by the location calculation unit 32 and information regarding a time at which the location information of the terminal 30 is calculated, and performs an error processing function or the like.

The terminal 30 according to an exemplary embodiment of the present invention may further include other elements for performing a basic function of the terminal itself, and such elements are obvious to the skilled person in the art, so a detailed description thereof will be omitted.

A method for collecting infrastructure information according to an exemplary embodiment of the present invention will now be described based on the foregoing positioning system and the infrastructure information collecting device.

Figure 7:
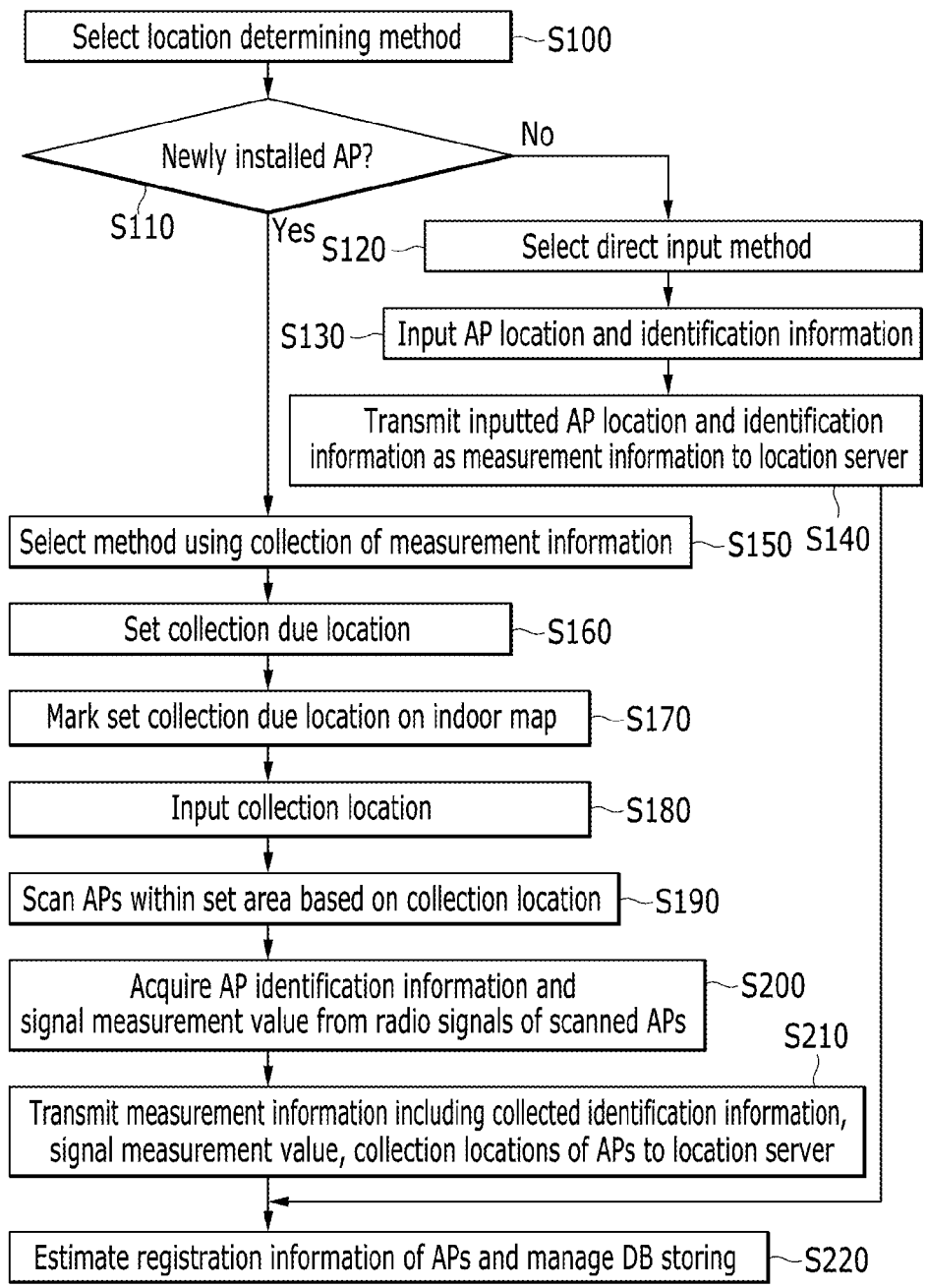
FIG. 7 is a flow chart illustrating the process of a method for generating wireless communication infrastructure information according to an exemplary embodiment of the present invention.

FIG. 7 is a flow chart illustrating the process of a method for generating wireless communication infrastructure information according to an exemplary embodiment of the present invention.

Here, information regarding the wireless communication infrastructure 60 including the APs 60a to 60n in the certain indoor space as shown in FIG. 2 is collected. The wireless communication infrastructure 60 is not a dedicated infrastructure newly installed in the corresponding indoor space, but is an existing infrastructure installed for radio communication.

In order to generate wireless communication infrastructure information for measuring a location in the indoor space as illustrated in FIG. 2, the infrastructure information collecting device 10 selects one of the direct input method and the method using a collection of measurement information as a location determining method (S100).

When the direct input method is selected according to a case in which a new AP is installed, or the like (S110, S120), the infrastructure information collecting device 10 displays map information with respect to a corresponding indoor space, sets a location directly inputted by the user on the displayed indoor map as a location as an AP, and sets identification information directly inputted by the user as identification information of the corresponding AP (S130). Then, the infrastructure information collecting device 10 transmits the inputted identification information and location information of the AP and measurement information of the corresponding AP to the location server 40 (S140).

Meanwhile, when information regarding an already installed AP, rather than installing a new AP, is intended to be obtained, the method using collection of measurement information is selected (S150). When the method using collection of measurement information is determined, the infrastructure information collecting device 10 sets at least one collection due location (S160). The collection due location may be set through various methods. For example, a certain location of an area (e.g., a movement path, etc.), excluding an area (e.g., a wall, pillar, etc., where the user cannot approach) from which collection of information regarding an AP is impossible, in the corresponding indoor space may be set as the collection due location.

When the collection due location is set, the infrastructure information collecting device 10 displays an indoor map of the corresponding indoor space and marks the collection due location on the indoor map (S170). With the collection due location displayed, the user of the infrastructure information collecting device 10 moves to the collection due location, and in this case, the user may move to the collection due location while comparing the surrounding indoor region information and the location on the indoor map.

After moving to the collection due location, the user inputs a collection location (S180), and the infrastructure information collecting device 10 performs a scanning operation to receive a signal transmitted from an AP located in a corresponding area within a predetermined distance based on the inputted collection location (S190). Here, because the user inputs the collection location in a state in which he has moved, and upon comparing the surrounding indoor region and the location on the indoor map displayed through the collecting device 10, the distance between the collecting device 10 and the AP is closer compared to when the collection location is inputted in the outer space. Thus, the strength of the signal that has been transmitted from the AP and is received by the collecting device 10 at the point where the collection location was inputted increases, so accurate measurement information regarding the AP can be acquired based on the signal.

The infrastructure information collecting device 10 acquires identification information and signal measurement value of at least one AP according to the scanning operation (S200). That is, the infrastructure information collecting device 10 acquires the identification information and signal measurement value of the corresponding AP from the signal received from the AP, and transmits the acquired identification information and signal measurement value of the AP and measurement information of the AP including the collection location at which the signal of the corresponding AP was received to the location server 40 (S210). In this manner, the location server 40 may estimate registration information, that is, the location information and/or signal characteristics information, of the AP based on the acquired measurement information of the AP, and may update the information regarding the corresponding wireless communication infrastructure stored in the database 41 or newly generate wireless communication infrastructure information (S220). Meanwhile, further, when the identification information and location information of the AP are transmitted in step S140, the location server 40 updates the information regarding the corresponding wireless communication infrastructure stored in the database 41 or newly generates wireless communication infrastructure information based on such information.

The foregoing steps S180 to S210 may be performed each time the collector moves to each of the set collection due locations and inputs the collection locations after movement, and as a result, pieces of measurement information of the APs are acquired from all of the set collection due locations in the corresponding indoor space as illustrated in FIG. 2. Then, the location server 40 estimates registration information of the APs based on the measurement information, and updates the information regarding the corresponding wireless communication infrastructure stored in the database 41 or newly generates wireless communication infrastructure information. The thusly generated or updated wireless communication infrastructure information is used for a positioning method (to be described later).

According to the infrastructure information collecting method according to an exemplary embodiment of the present invention, the locations of the APs constituting the wireless communication infrastructure are estimated based on the information acquired by using the indoor map-based infrastructure information collecting device. Thus, compared with the conventional methods for estimating an AP location, because the indoor map is used, the locations of APs can be quickly and accurately estimated in an indoor space such as the indoor of a building or the like. Also, the accuracy of the calculated location information of the APs is better than that of the location information of the APs calculated by using outdoor collection locations acquired from the existing GPS. In addition, compared with the existing indoor positioning technique, because the already installed wireless communication infrastructure is employed, the cost for otherwise installing a dedicated infrastructure can be saved, and indoor precise positioning information of a few meter class can be provided by simply installing an indoor map and software without altering hardware in a general terminal (e.g., a smart phone, etc.) including a wireless communication infrastructure receiving device (e.g., a WLAN receiver, and the like).

A positioning method for measuring a location based on wireless communication infrastructure information generated based on the foregoing infrastructure information collecting method according to an exemplary embodiment of the present invention will now be described.

Figure 8:
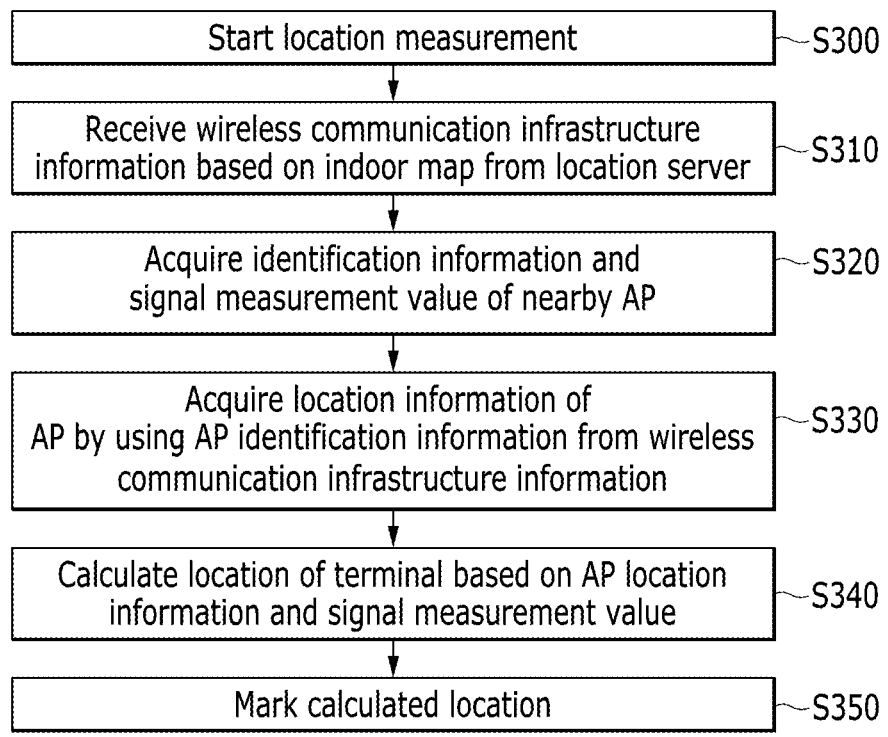
FIG. 8 is a flow chart illustrating the process of a positioning method according to a first exemplary embodiment of the present invention.
Figure 9:
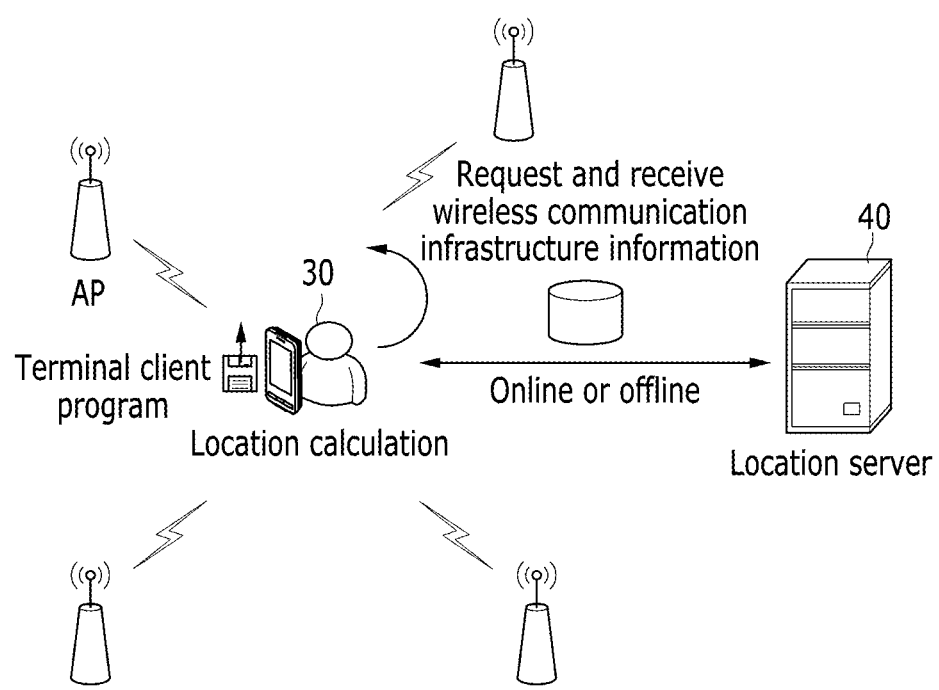
FIG. 9 illustrates a service-providing flow according to a positioning method according to the first exemplary embodiment of the present invention.

FIG. 8 is a flow chart illustrating the process of a positioning method according to a first exemplary embodiment of the present invention, and FIG. 9 illustrates a service providing flow according to a positioning method according to the first exemplary embodiment of the present invention.

The positioning method according to the first exemplary embodiment of the present invention may be performed when the terminal measures its location by itself.

As shown in FIG. 8, when the terminal 30 wants to measure its location, the service function part 31 of the terminal 30 receives wireless communication infrastructure information from the location server 40 of the positioning system according to an exemplary embodiment of the present invention. Meanwhile, when the terminal 30 supports the GNSS function, the terminal may receive GNSS-related information (i.e., positioning auxiliary information) from the location server 40. Here, the terminal 30 may be requested to measure its location through a client program executed by itself, and the terminal 30 may receive the wireless communication infrastructure information or the GNSS-related information before or after it starts location measurement (S300, S310).

Thereafter, the terminal 30 selects one of the available positioning methods. The measurement method selecting module 321 of the terminal 30 may select one of the GNSS positioning method, the wireless communication infrastructure positioning method, and the wireless communication infrastructure/GNSS composite positioning method. That is, a positioning method can be selected in various manners. For example, the terminal 30 may select one positioning method according to a user request, or one positioning method is automatically selected in consideration of the function of the terminal. Here, the following process will be described on the assumption that the wireless communication infrastructure positioning method is selected.

A corresponding location calculation module is operated according to the selected positioning method to measure the location of the terminal.

When the wireless communication infrastructure positioning method is employed, the first location calculation module 322 acquires information regarding nearby APs. In detail, the first location calculation module 322 receives radio signals transmitted from the APs 60a to 60i of the wireless communication infrastructure 60, and acquires identification information and signal measurement values of the respective APs by using the received radio signals (S320). The first location calculation module 322 checks the locations of the APs 60a to 60i from the wireless communication infrastructure information received from the service function unit 31 based on the identification information among the acquired measurement information of the APs 60a to 60i (S330). In this case, the locations (horizontal location information) on the indoor map of the indoor space where the APs 60a to 60i are located can be acquired. The first location calculation module 322 calculates the location of the terminal 30 based on the checked locations of the APs 60a to 60i and the signal measurement values (S340). Here, the locations can be calculated by applying the signal measurement values and the location coordinates to the method known in the art, and a detailed description of the location calculation method will be omitted.

Meanwhile, the first location calculation module 322 may acquire an indoor map of the indoor space in which the APs 60a to 60i are disposed based on the identification information among the acquired measurement information of the APs 60a to 60i. The first location calculation module 322 may display the acquired indoor map through a display device (not shown) and mark the calculated location of the terminal on the indoor map (S350) to allow the user of the terminal 30 to recognize or check the location of the terminal 30.

The service management unit 33 of the terminal 30 may store the time at which the location of the terminal was calculated by the location calculation unit 32 and the calculated location information by matching them, and manage them.

According to an exemplary embodiment of the present invention, the terminal 30 can measure its location more accurately by using the wireless communication infrastructure information of each area (i.e., each indoor space) generated based on the indoor map through the infrastructure information collecting device 10 according to an exemplary embodiment of the present invention.

A positioning method according to a second exemplary embodiment of the present invention will now be described.

Figure 10:
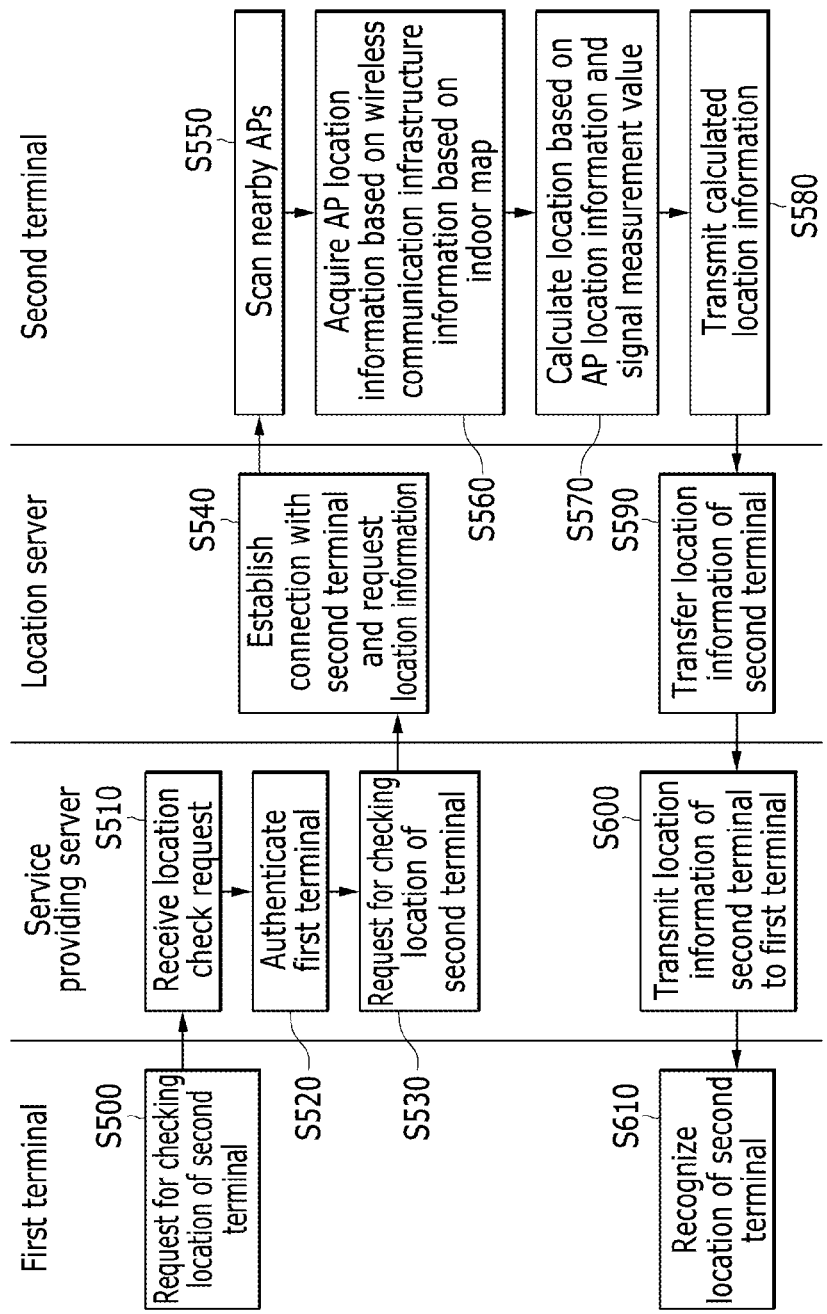
FIG. 10 is a flow chart illustrating a positioning method according to a second exemplary embodiment of the present invention.
Figure 11:
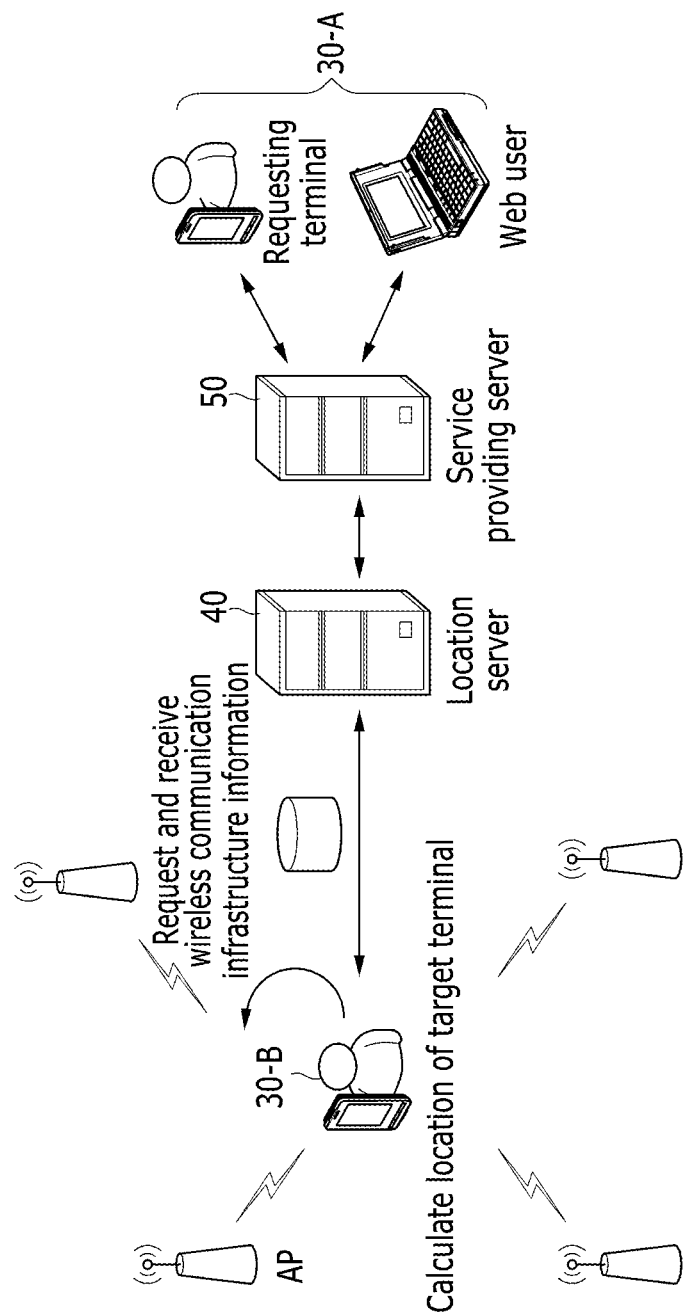
FIG. 11 illustrates a service-providing flow according to a positioning method according to the second exemplary embodiment of the present invention.

FIG. 10 is a flow chart illustrating a positioning method according to a second exemplary embodiment of the present invention, and FIG. 11 illustrates a service-providing flow according to a positioning method according to the second exemplary embodiment of the present invention.

The second exemplary embodiment of the present invention relates to a method for measuring the location of a second terminal when a first terminal accesses the service providing server 50 and requests checking of the location of the second terminal. In FIG. 11, reference numeral 30-A denotes the first terminal and 30-B denotes the second terminal.

As shown in FIG. 11, a Web user or a user using a wireless terminal such as a mobile phone or the like may access the service providing server 50 by using the first terminal (e.g., a computer, a mobile phone, and the like) 31 and request a measurement of the location of the second terminal 30-B (S500).

When a request for checking the location of the second terminal 30-B is received along with information (e.g., a phone number of the mobile terminal, etc.) regarding the second terminal 30-B, whose location is desired to be measured, from the first terminal 30-A, the service providing server 50 authenticates the first terminal 30-A (S510, S520). When authentication is completed, the service providing server 50 transfers the information regarding the second terminal whose location is to be measured to the location server 40, requesting a measurement of the location of the second terminal (S530).

The location server 40 establishes a connection with the second terminal 30-B based on the information (e.g., the phone number of the mobile terminal) regarding the second terminal 30-B transferred from the service providing server 50. When the location server 40 is connected with the second terminal 30-B, the location server 40 requests location information from the second terminal 30-B (S540).

In this case, the location server 40 may update the wireless communication infrastructure information stored in the database 41 based on the measurement information of APs newly transmitted from the infrastructure information collecting device 10, and also transmits the wireless communication infrastructure information stored in the database 41 to the second terminal 30-B according to a corresponding request of the second terminal 30-B or regardless of the request.

Thereafter, as described above according to the first exemplary embodiment of the present invention, the second terminal 30-B measures its location based on the wireless communication infrastructure information generated based on the indoor map and transmits the measured location information to the location server 40 (S550 to S580). In this case, the second terminal 30-B may transmit the identification information with respect to the indoor map used for measuring its location, along with its location information.

The location server 40 receives the location information transmitted from the second terminal 30-B and delivers it to the service providing server 50 (S590), and the service providing server 50 then provides the location information of the second terminal 30-B to the first terminal 30-A that has requested the service (S600). In this case, the service providing server 50 may provide the corresponding indoor map based on the used indoor map identification information provided from the location server 50 to the first terminal 30-A, so that the user of the first terminal 30-A can recognize or check the location of the second terminal 30-B on the indoor map. Through such process, the first terminal 30-A can easily recognize or check the precise location of the second terminal 30-B (S610).

A positioning method according to a third exemplary embodiment of the present invention will now be described.

Figure 12:
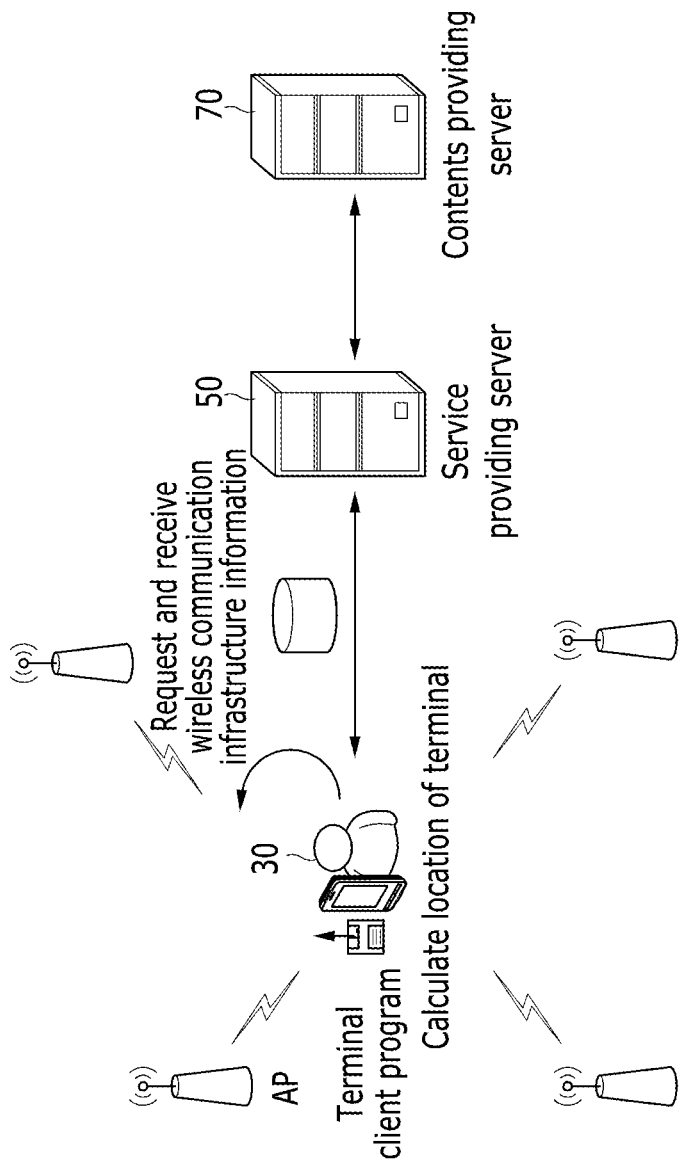
FIG. 12 illustrates a service-providing flow according to a positioning method according to a third exemplary embodiment of the present invention.

FIG. 12 illustrates a service providing flow according to a positioning method according to a third exemplary embodiment of the present invention.

The positioning method according to the third exemplary embodiment of the present invention is the same as that of the first exemplary embodiment as described above, except that relevant contents information is additionally provided based on measurement information.

Like the positioning method according to the first exemplary embodiment as described above, the terminal 30 receives wireless communication infrastructure information generated based on the indoor map provided from the positioning system, measures its location based on the received wireless communication infrastructure information, and then requests relevant contents while providing the measured location information to the positioning system.

In this case, as shown in FIG. 12, the service providing server 50 of the positioning system may transfer the location information provided from the terminal 30 to a contents providing server 70 that provides contents, in order to request contents related to the corresponding location information. Thereafter, when contents (e.g., information regarding stores, theaters, restaurants, etc., located within a predetermined distance based on the location of the terminal) related to the location of the terminal is transferred to the service providing server 50, the service providing server 50 provides the received contents to the terminal 30.

Accordingly, the terminal 30 can more accurately measure its location based on the wireless communication infrastructure information based on the indoor map and can be easily provided with the contents related to its location which has been accurately measured.

According to an embodiment of the present invention, information related to APs constituting an existing wireless communication infrastructure can be collected based on an indoor map in an indoor space. In particular, compared with the methods for estimating the locations of existing APs, the locations of APs can be quickly and accurately measured by using an indoor map in an indoor space such as a room of a building. Also, because the locations of APs are measured by using an indoor map, the accuracy of the measured locations can be improved.

Further, compared with the existing positioning technique, because the already installed wireless communication infrastructure is used, the cost for installing a dedicated infrastructure can be reduced. Also, a general terminal (e.g., a smart phone) including a wireless communication infrastructure receiving device (e.g., a WLAN receiver) can provide precise indoor positioning information of a few-meter level by simply installing an indoor map and additional software without changing hardware.

In addition, because the measured locations of APs are used for measuring the location of a terminal, the location of the terminal can be accurately measured.

The exemplary embodiments of the present invention as described so far are not implemented only through a device (object) or a method, but may be implemented through a program that can execute a function corresponding to the configuration of the infrastructure information collecting method and positioning method according to the exemplary embodiments of the present invention or a computer-readable recording medium storing the program, and such implementation may be easily made by the skilled person in the art to which the present invention pertains from the description of the foregoing exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for collecting, by a collecting device, information related to a wireless communication infrastructure including at least one wireless access device in association with a positioning system in an indoor space through a network, the method comprising:

setting a collection due location for collecting information on a map of an area where collection of the information on the map is planned and marking the set collection due location on the map;

the collecting device being movable to the marked collection due location on the map and receiving, by the collecting device, a collection location inputted by a user;

receiving, by the collecting device, a radio signal transmitted from at least one wireless access device of the wireless communication infrastructure located at an area within a signal reception range of the collecting device at the collection location;

generating measurement information regarding the wireless access device based on the received radio signal;

transmitting, by the collecting device, the generated measurement information to the positioning system, selecting a method for determining the location of the wireless access device; and receiving identification information and location information of the wireless access device from a user, when a direct input method is selected by the selecting, wherein the received identification information and location information of the wireless access device are transmitted to the positioning system via a communication, wherein when a method for collecting measurement information is selected by the selecting, a collection location determining that sets the collection due location is made.

2. The method of claim 1, wherein the measurement information comprises a signal measurement value of the radio signal received from the wireless access device, identification information of the wireless access device acquired from the radio signal, and the collection location of the radio signal received from the wireless access device.

3. The method of claim 1, further comprising:
receiving, by the collecting device, identification information and location information regarding at least one wireless access device included in the wireless communication infrastructure from a user; and transmitting, by the collecting device, the received identification information and location information regarding the wireless access device, as measurement information, to the positioning system.

4. A positioning method for measuring the location of a terminal located in an indoor space, the method comprising:
receiving, by a terminal, wireless communication infrastructure information related to the indoor space from a location server through a network, the wireless communication infrastructure information including identification information and location information regarding wireless access devices constituting a wireless communication infrastructure and the location information being generated based on an indoor map regarding an indoor space;

receiving, by the terminal, a radio signal transmitted from at least one wireless access device constituting the wireless communication infrastructure in the indoor space;

checking, by the terminal, location information of the wireless access device having corresponding identification information from the wireless communication infrastructure by using identification information extracted from the radio signal; and calculating, by the terminal, its location based on the received radio signal and the checked location information of the wireless access device, selecting a method for determining the location of the wireless access device; and receiving identification information and location information of the wireless access device from a user, when a direct input method is selected by the selecting, wherein the received identification information and location information of the wireless access device are transmitted to the positioning system via a communication, wherein when a method for collecting measurement information is selected by the selecting, a collection location determining that sets the collection due location is made.

5. The method of claim 4, further comprising:
transmitting, by the terminal, the calculated location of the terminal to a service providing server through the network; and receiving, by the terminal, content related to the location from the service providing server.

6. A positioning method for measuring a location by a positioning system, the method comprising:
receiving, by the positioning system, a request for measuring the location of a second terminal from a first terminal;

providing, by the positioning system, wireless communication infrastructure information to the second terminal, the wireless communication infrastructure information including identification information and location information regarding wireless access devices constituting a wireless communication infrastructure and the location information being generated based on an indoor map regarding an indoor space;

receiving, by the positioning system, location information of the second terminal generated based on the wireless communication infrastructure information from the second terminal; and providing, by the positioning system, the location information of the second terminal to the first terminal, selecting a method for determining the location of the wireless access device; and receiving identification information and location information of the wireless access device from a user, when a direct input method is selected by the selecting, wherein the received identification information and location information of the wireless access device are transmitted to the positioning system via a communication, wherein when a method for collecting measurement information is selected by the selecting, a collection location determining that sets the collection due location is made.

7. The method of claim 6, wherein the location information of the wireless communication infrastructure information is calculated based on a certain location on the indoor map and a signal measurement value with respect to a corresponding wireless access device collected from the location.

8. A device for collecting information related to a wireless communication infrastructure including at least one wireless access device in association with a positioning system through a network, the device comprising:
a map database storing an indoor map of each indoor space;

a map display unit displaying the indoor map provided from the map database;

a collection location determining unit setting a collection due location for collecting information on the indoor map where collection of the information on the map is planned and where the information is displayed on the map display unit and marking the set collection due location on the indoor map;

a collection location input unit receiving a certain location on the indoor map inputted by a user, as a collection location;

a measurement information collecting unit receiving a radio signal transmitted from at least one wireless access device located within a signal reception range of the collecting device at the collection location and generating measurement information regarding the corresponding wireless access device based on the received signal;
a communication unit transmitting the measurement information to the positioning system;
a method selecting unit selecting a method for determining the location of the wireless access device; and
an input information processing unit receiving identification information and location information of a wireless access device from a user, when a direct input method is selected by the method selecting unit,
wherein the received identification information and location information of the wireless access device are transmitted to the positioning system via the communication unit,
wherein when a method for collecting measurement information is selected by the method selecting unit, the collection location determining unit sets the collection due location.

9. The device of claim 8, wherein the measurement information comprises a signal measurement value of the radio signal received from the wireless access device, identification information of the wireless access device acquired from the radio signal, and the collection location.

10. A positioning system for measuring a location in association with an infrastructure information collecting device and a first terminal through a network, the system comprising:
a database storing wireless communication infrastructure information generated based on measurement information provided from the infrastructure information collecting device;
a positioning information management unit providing the wireless communication infrastructure information to the first terminal, receiving location information generated based on the wireless communication infrastructure information provided from the terminal, and managing the wireless communication infrastructure information of the database based on inputted registration information; and
a registration information estimating unit generating registration information regarding a wireless access device constituting a wireless communication infrastructure based on the measurement information provided from the infrastructure information collecting device and providing the generated registration information to the positioning information management unit, the registration information including identification information and location information regarding wireless access devices;
a method selecting unit selecting a method for determining the location of the wireless access device; and
an input information processing unit receiving identification information and location information of a wireless access device from a user, when a direct input method is selected by the method selecting unit,
wherein the received identification information and location information of the wireless access device are transmitted to the positioning system via the communication unit,
wherein when a method for collecting measurement information is selected by the method selecting unit, the collection location determining unit sets the collection due location.

11. The system of claim 10, wherein the measurement information provided from the infrastructure information collecting device comprises a signal measurement value of the radio signal received from the wireless access device, identification information of the wireless access device acquired from the radio signal, and the collection location of the radio signal received from the wireless access device.

12. The system of claim 10, wherein the positioning information management unit comprises:
a positioning auxiliary information management unit receiving positioning auxiliary information for measuring the location of the terminal from a different infrastructure system via a network, processing the positioning auxiliary information according to a protocol supported by the terminal, and providing the processed positioning auxiliary information to the terminal; and
an infrastructure information management unit performing management comprising providing the wireless communication infrastructure information to the terminal and updating the wireless communication infrastructure information stored in the database based on the registration information.

13. The system of claim 10, further comprising
a service providing server receiving a request for measuring the location of a second terminal from the first terminal, delivering the received request to the positioning information management unit, and delivering location information of the second terminal delivered from the positioning information management unit to the first terminal.

* * * * *